Patented Aug. 10, 1926.

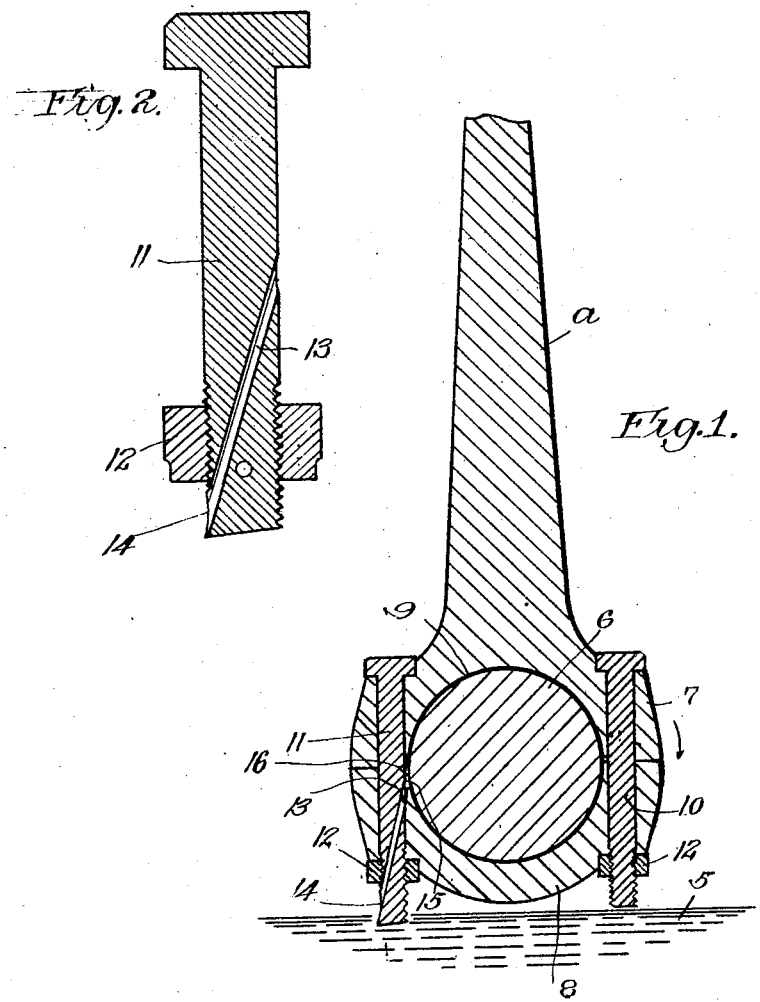

1,595,131

UNITED STATES PATENT OFFICE.

BENJAMIN H. WILDER, OF ORLEANS, CALIFORNIA.

CRANK-PIN LUBRICATOR.

Application filed September 27, 1924. Serial No. 740,337.

The general object of the invention is to provide for lubricating the crank pin bearings of an internal combustion motor in instances where lubricating devices, such as dippers, do not form part of the general equipment of the motor.

The above and other objects are accomplished by instrumentalities pointed out in the following specification.

The invention is clearly defined in the claim.

A satisfactory embodiment of the invention is illustrated in the accompanying drawings forming part of the specification and in which:—

Figure 1 is a central vertical cross section taken through a crank pin and the lower end portion of a connecting rod and showing the invention in use; and Figure 2 is an enlarged detail vertical cross-section of the cap bolt shown on the left of Figure 1.

The device of this invention is primarily intended for use in connection with a hydrocarbon motor wherein the crank shaft is disposed within a crank case adapted to provide a receptacle for a column of lubricant. The invention is further intended for use in connection with a reciprocating hydrocarbon motor wherein the lower end of the connecting rod in rotating moves into and out of the body of oil contained within the crank case. In the drawings, the oil level is indicated by 5 and the lower end of the connecting rod a, which rotates in the direction of the arrow, moves into and out of the oil in each reciprocation of the piston to which the rod a is connected and by which it is operated in a well-known manner.

The crank pin 6 forming part of an ordinary crank shaft is disposed in a bearing provided by a yoke 7 at the lower end of the connecting rod a and a connecting rod cap 8. The usual bushing 9 is interposed between the surfaces of the crank pin 6 and the yoke and cap 8. The connecting rod bolts 10 and 11 are disposed in alining transverse openings in the yoke 7 and cap 8 and operate to connect the cap to the rod when nuts 12 are tightened upon the threads of the bolts as shown.

In carrying out the present invention in connection with the arrangement of parts just described, I provide one of the cap bolts with an open ended duct 13. This duct extends in the direction of the length of the bolt, and the lower end of the latter projects beyond the cap 8 so as to move into and out of the lubricant 5 in rotating with the connecting rod.

The lower end of the duct 13 is enlarged laterally, as indicated by 14, and opens through the screw threaded surface of the bolt and is approximately pear-shaped in contour. This construction adapts the lower end of the duct to function as a spoon or dipper for lifting a quantity of lubricant and directing the same into the body of the duct.

For purposes of illustration I have shown the duct as extending from the extreme lower end of one side of the bolt 11 obliquely upward and opening through the opposite side of the bolt at a point substantially in alinement with the center of crank pin 6, or adjacent to one end of the cap 8. The inner surface of the cap 8 at a point in alinement with the upper inner end of the duct is cut away so as to provide a port 15 which extends into the opening for the bolt 11. This construction provides a continuation of the duct 13 and a passage for lubricant to the interior of the cap.

A portion of the bushing 9 in alinement with the port 15 is broken away as indicated by 16 to provide a continuation of the port 15 so that lubricant moving into the port 15 and through the broken away portion 16 of the bushing readily finds its way between the contacting surfaces of the pin 6 and bushing 9; it being well known that the bushings usually provided in bearings of this kind have intersecting ducts for conveying lubricant around the surface of the crank pin.

From the foregoing it is to be observed that the present construction provides an efficient dipper for delivering oil to the bearing of a crank pin and is usable where dippers are not provided in the equipment of connecting rods and is also usable as an auxiliary dipper in instances where the regular form of dipper is provided.

Although I have shown and described one embodiment of my invention, it is to be understood that the same is susceptible of various changes; and I reserve the right to employ such as may come within the scope of the appended claim.

I claim:

A crank pin bearing lubricator for internal combustion motors comprising opposed bearing members forming one end of a connecting rod and having alined bolt receiving openings and a port extending into one of said openings and into the bearing surface for the crank pin, means for connecting said members together including a bolt disposed within the bolt receiving openings and having one end projecting beyond one of of said bearing members and provided with a lubricant conveying duct, one end of which communicates with the said port and the opposite end of which extends through the projecting end portion of the bolt.

BENJAMIN H. WILDER.